United States Patent
Maier et al.

(10) Patent No.: US 6,825,048 B1
(45) Date of Patent: Nov. 30, 2004

(54) COMBINATIONAL METHOD FOR MICROGRAM-SCALE PRODUCTION AND CHARACTERIZATION OF CRYSTALLINE AND AMORPHOUS LIBRARIES OF MATERIALS

(75) Inventors: Wilhelm F. Maier, Essen (DE); Jens Klein, Heidelberg (DE); Christian Lehmann, Mülheim an der Ruhr (DE); Hans-Werner Schmidt, Mülheim an der Ruhr (DE)

(73) Assignee: hte Aktiengesellschaft the high throughput experimentation company, Heidelberg (DE)

( * ) Notice: Subject to any disclaimer, the term of this patent is extended or adjusted under 35 U.S.C. 154(b) by 0 days.

(21) Appl. No.: 09/700,401

(22) PCT Filed: May 12, 1999

(86) PCT No.: PCT/EP99/03287

§ 371 (c)(1),
(2), (4) Date: Feb. 26, 2001

(87) PCT Pub. No.: WO99/59716

PCT Pub. Date: Nov. 25, 1999

(30) Foreign Application Priority Data

May 16, 1998 (DE) .......................................... 198 22 077

(51) Int. Cl.$^7$ .................... G01N 33/543; G01N 27/416; G12M 1/00

(52) U.S. Cl. .................... 436/518; 436/149; 435/283.1; 435/289.1; 435/DIG. 9; 435/DIG. 10; 435/DIG. 11; 435/DIG. 12; 435/DIG. 13; 435/DIG. 29; 435/DIG. 40; 435/DIG. 50; 378/70; 378/80; 378/81; 378/208

(58) Field of Search ................................. 436/518, 149; 435/283.1, 289.1, DIG. 9, DIG. 10, DIG. 11, DIG. 12, DIG. 13, DIG. 29–33, DIG. 40, DIG. 50, DIG. 46; 378/70–81, 208

(56) References Cited

U.S. PATENT DOCUMENTS 6,371,640 B1 * 4/2002 Hajduk et al. .............. 378/208

FOREIGN PATENT DOCUMENTS

| WO | WO 98/15501 | * | 4/1998 |
| WO | WO 99/19724 A1 | * | 4/1999 |

* cited by examiner

Primary Examiner—Padmashri Ponnaluri
(74) Attorney, Agent, or Firm—Jones Day

(57) ABSTRACT

The present invention relates to a method for the wet chemical preparation of materials libraries consisting of a large number of solids, the solids being deposited from reaction mixtures in microreaction chambers onto a bottom plate which simultaneously serves as the library substrate. Depending on the material selected for the library substrate, the solids can subsequently be examined non-destructively, for example, by reflecting or penetrating microarea X-ray diffraction.

10 Claims, 3 Drawing Sheets

COMBINATIONAL METHOD FOR MICROGRAM-SCALE PRODUCTION AND CHARACTERIZATION OF CRYSTALLINE AND AMORPHOUS LIBRARIES OF MATERIALS

CROSS-REFERENCE TO RELATED APPLICATIONS

This application is a 371 of PCT/EP99/03287, filed on May 12, 1999, which claims benefit of German Patent Application No. 198 22 077.4 filed May 16, 1998.

FIELD OF THE INVENTION

The present invention relates to a method for the wet chemical preparation of materials libraries consisting of a large number of solids, the solids being deposited from reaction mixtures in microreaction chambers onto a bottom plate which simultaneously serves as the library substrate.

BACKGROUND OF THE INVENTION

The narrowest bottleneck in the development of new active substances, polymers and materials is the discovery of suitable new leading structures. In fields of organic, biochemical and pharmaceutical chemistry, combinatorics has become established within a few years as an important tool for the development of new compounds (e.g., Special issue: Combinatorial Chemistry, Ace. Chem. Res., 1996, 29; G. Lowe, Chemical Society Reviews, 1995, 24 (5), 309; S. R. Wilson, A. W. Czamik, Combinatorial Chemistry—Synthesis and Application, John Wiley & Sons, 1997). In contrast, only a few examples of using a combinatorial search for materials are known in the field of inorganic solid synthesis and materials research or technical catalyst development. The preparation of materials libraries by combinatorial syntheses has been reported for finding new superconducting materials (X.-D. Xiang et al., Science, 1995, 268, 1738), new magnetoresistant materials (G. Briceno et al., Science, 1995, 270, 273) and new luminescent materials (E. Danielson et al., Science, 1998, 279, 837). A common feature of all these methods is that the application of the substances as thin films by electron beam vaporization or RF sputtering under reduced pressure results in the formation of a materials library. The shape is created by a physical mask, which already resulted in libraries of as much as 25,000 materials. The first combinatorial production of a materials library by a wet chemical method using ink jet technology resulted in the development of luminescent materials (D. Sun et al., Adv. Mater. 9, 1046–1049, 1997). There is a drawback in that this method can only be employed at normal pressure and low temperatures.

Many of the materials known to date, especially the porous substances important to catalysis, can be prepared exclusively by a wet chemical method, often by a hydrothermal process (e.g., M. W. Anderson et al., Angew. Chem., 1995, 107, 1115; D. P. Serrtano et al., Microporous Materials, 4 (1995), 273). These methods are distinguished only by the selected ranges of temperature and pressure, the variation of the stoichiometric proportions of the selected precursors, and the template molecules selected (L. D. Rollmann, Inorganic Compounds with unusual Properties-II, 1979, 387). Depending on the sample volume and experimental procedure, a synthesis under hydrothermal conditions takes from 2 hours to several weeks. This is followed by the further processing and characterization of the product. The most important analytical method is powder diffraction for elucidating the phase structure. Of particular importance to the application of such materials in fields such as catalysis or sensor technology is their pore architecture which can be controlled by the addition of template molecules in hydrothermal synthesis. To date, due to the high expenditure of time for one synthesis and the wide variety of possible mixed oxides and template molecules, a systematic and exhaustive examination of these classes of materials has been impossible. Due to the wide variety of possible polynary mixtures of oxide materials and the generally possible template molecules for influencing the pore architecture of such materials, a transfer of the methods of combinatorial chemistry to hydrothermal synthesis is attractive.

The first application of combinatorial methods in hydrothermal synthesis was reported by Akporiaye, Karlsson and Wendelbo (D. E. Akporiaye, I. M. Dahl, A. Karlsson, R. Wendelbo, Angew. Chem., 1998, 110, No. 5, 629; D. E. Akporiaye, I. M. Dahl, A. Karlsson, P. Wendelbo, patent pending, Norwegian Application No. 97.0788). They developed an autoclave by means of which 100 hydrothermal syntheses (reaction volumes of 500 ml each) at temperatures of up to 200° C. can be performed simultaneously. There is a drawback in that this process does not produce a materials library, but the solids produced must be removed from the individual minireactors and individually characterized by standard methods. This kind of handling the samples after synthesis has proven very cumbersome and significantly limits the performance of this combinatorial approach.

SUMMARY OF THE INVENTION

In one embodiment of the invention a method for the wet chemical preparation of a materials library comprising a large number of solids from reaction mixtures having different compositions is provided. The reaction mixtures are introduced, in a spatially separated way, into microreaction chambers in removable reaction plates in a reactor and reacted in the form of solutions or suspensions in the microreaction chambers at temperatures of up to 1000° C. and internal pressures of up to 1000 bar. The solids produced in the reactions being deposited in a spatially separated way on a removable reactor bottom plate. Preferably, the reactor bottom plate comprises a material that scatters X-rays elastically. Further, reflecting microarea X-ray diffraction may be employed to investigate the materials library deposited onto the reactor bottom plate.

DETAILED DESCRIPTION OF THE INVENTION

Figure 1:
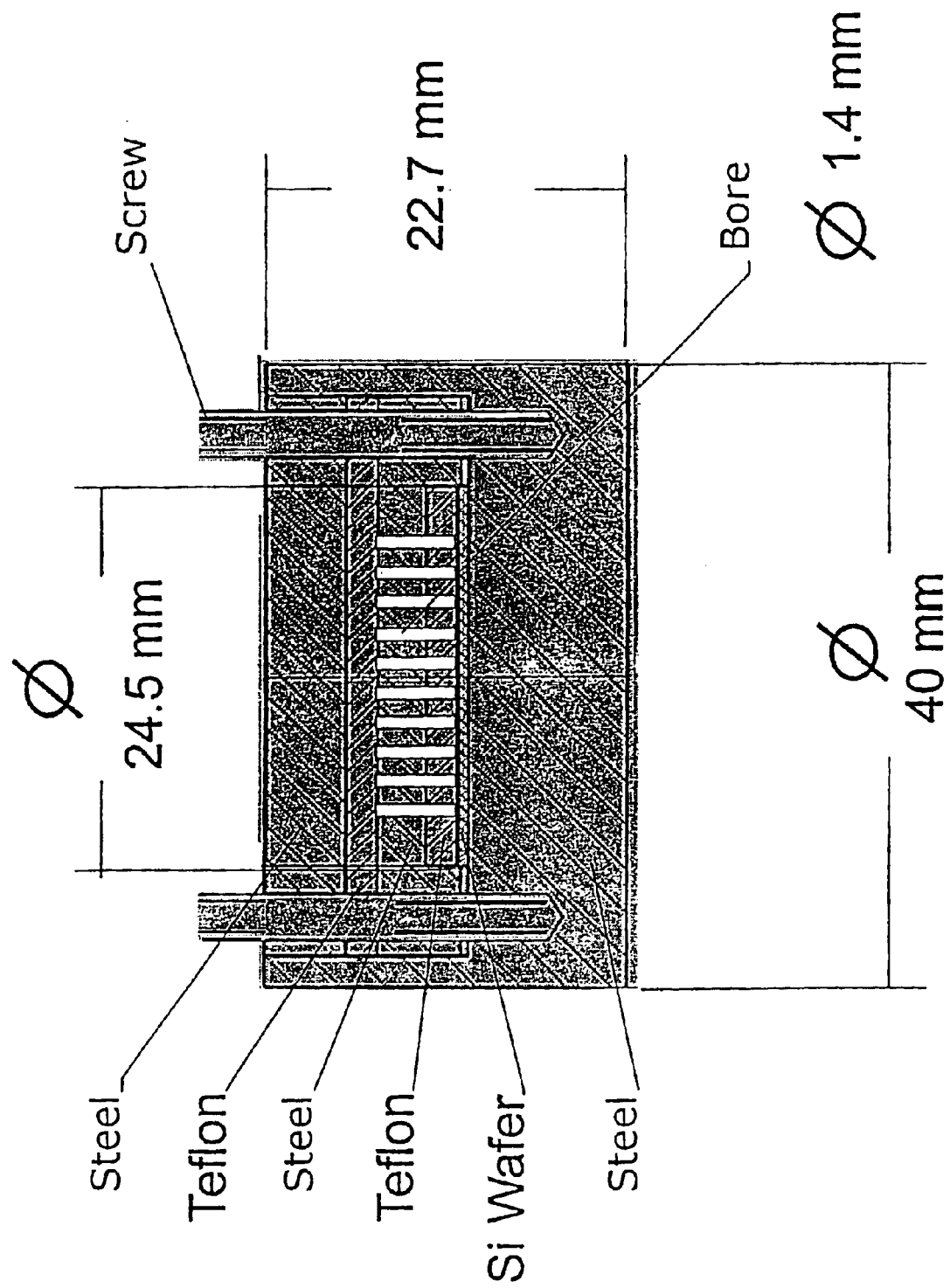
FIG. 1: Special embodiment of the reactor as employed in the Example.

We have now found that materials libraries with extremely low quantities of materials (reaction volumes of 2 $\mu$L or less) can be prepared by a wet chemical method. Thus, a large number of reaction mixtures of different compositions are simultaneously reacted in microreaction chambers included in a plate ("reaction plate"), for example, in the form of bores, the solids produced being deposited on the bottom plate of the reactor. Subsequently, the solids are freed from the supernatant liquid phase and calcined whereby they adhere in a spatially separated way to the bottom plate. By appropriately selecting the material of the bottom plate of the reactor, it may also serve as the library substrate. Alternatively, the solids or subsets thereof may be transferred to a plastic sheet provided with an adhesive layer so that a printed materials library on another library substrate is formed.

Depending on the material selected for the reactor bottom plate or the sheet, different analytical methods can be employed for characterizing the solids, such as reflecting microarea X-ray diffraction, if the bottom plate is made of a material which will scatter X-rays elastically and cause a low scattering background. Suitable materials include single-crystal slices, preferably of Si, Cu, quartz, rutile, anatase, zirconia, Ge, Al, sapphire, Fe, Ti, Zr, Co, Ni or Sn, more preferably a (711) Si single-crystal wafer. Suitable for examination with penetrating microarea X-ray diffraction are X-ray transparent materials, such as Kapton, Kevlar, Teflon, Mylar, PVC, polyethylene, polypropylene, polycarbonate, Al, Be or Mg in layer thickness of <100 $\mu$m, preferably <10 $\mu$m.

The reactor for generating the materials libraries has a layered design: Over the bottom plate of the reactor, which may serve as the library substrate, there are provided at least two reaction plates of an inert material having bores of from 0.05 to 20 mm in diameter which serve as microreaction chambers. The topmost reaction plate consists of a hard material, e.g., steel. On top thereof, there is a sealing layer without bores, e.g., made of Teflon, and still on top, there is a layer of a hard material with which the reactor layers are compressed and sealed using suitable devices. When the materials employed are appropriately selected, reaction temperatures of up to about 1000° C. are possible; when Teflon is used for sealing, a maximum of 350° C. is possible.

The reactor can have very small dimensions and extremely small reactor volumes and meets the highest safety demands. A reasonable and practicable miniaturization of the materials library is currently limited only, on the one hand, by the focusability of the X-ray beam during the measurement of X-ray diffraction, and on the other hand, by the dimensions of the liquid dispensing means. While 10 samples per mm can already be analyzed with a minute X-ray beam diameter of 50 $\mu$m (=10,000 samples/cm$^2$), only 5 samples per mm can be realized for a dispensable sample quantity of 0.5 $\mu$L and a minireactor height of 10 mm (=2,500 samples/cm$^2$=250,000 samples/dm$^2$).

The application of combinatorial techniques to synthesis optimizations, systematic variations of the compositions and preparation conditions enables a fast optimization of solid syntheses and a drastic speed-up of the discovery of new solids. Thus, the development of materials can be inexpensively performed in a normal laboratory without additional safety measures. Also, due to its small dimensions, the reactor can be handled without problems in glove boxes under inert gas, and when appropriately modified, it can be charged with reactive gases, such as ammonia, chlorine, methane, borane, HCl, hydrogen, oxygen or fluorine, hermetically sealed and thus employed for the synthesis of new materials.

An automated examination of all solids of a thus prepared materials library is possible, for example, by the phase identification of the individual materials using the commercial GADDS microdiffractometer of Bruker-AXS (M. Schuster, H. Goebel, Appl. Phys. 28 (1995), A270–A275; H. Goebel, PCT Int. Appl. WO 95/22758 A1). This concept enables a direct identification of the substances formed. The separate preparation of samples for measurement is avoided. In addition to phase identification by non-destructive microarea X-ray diffraction, the complete library is available for other examinations, such as catalytic activity using IR-thermography (Maier, Holzwarth, DE A19757 754.7 of Dec. 23, 1997), luminescence, magnetic resistance and other characterizations.

In particular, the method relates to the preparation or deposition of crystalline and amorphous solids from liquid phases, such as solutions, emulsions, suspensions or sols. Above all, suitable fields include sol-gel synthesis (C. J. Brinker, G. W. Scherrer, "Sol-Gel Science, the Physics and Chemistry of the Sol-Gel Process", Academic Press, New York 1990), hydrothermal syntheses (Kirk-Othmer (3rd) 6, 321), hydrometallurgy, decomposition of preceramic materials to produce hard materials (D. Segal, Chemical Synthesis of Advanced Ceramic Materials, Cambridge University Press, New York 1989) and polymerizations.

The method according to the invention is useful, for example, for the discovery of new materials in the field of inorganic solids, especially in the field of mixed oxides, mixed carbides, mixed nitrides and mixed borides. These materials are employed in many fields of everyday life and industrial production as lead-structures for catalysts, optical waveguides, coatings, semiconductors, superconductors, ferromagnetic materials, magnetic reluctors, optical materials, hard materials, luminescent and fluorescent materials, sensors, NLO materials, special materials and many more. Especially the class of substances including crystalline porous materials, such as zeolites or amorphous porous mixed oxides, mixed carbides or mixed nitrides, is of great interest to the industry. They are employed technically as catalysts for oil refinement in petrochemistry as well as for the preparation of pharmaceuticals, fine and bulk chemicals. A wide variety of oxidation reactions is catalyzed by them: aromatic hydroxylation, olefin epoxidation, ketone ammoxidation, alcohol oxidation and alkane oxyfunctionalization, to name but a few. Similarly promising are the stable amorphous mixed oxides whose properties are as important as those of the crystalline materials, but whose preparation is mostly simpler than that of the well-defined crystalline materials.

EXAMPLE

The combinatorial modification of a conventional laboratory titanium silicalite synthesis under hydrothermal conditions (UK Patent 2 071 071 B) is used as an example to show how a materials library of crystalline and amorphous materials can be prepared and analyzed with a minimum expenditure of time.

Figure 2:
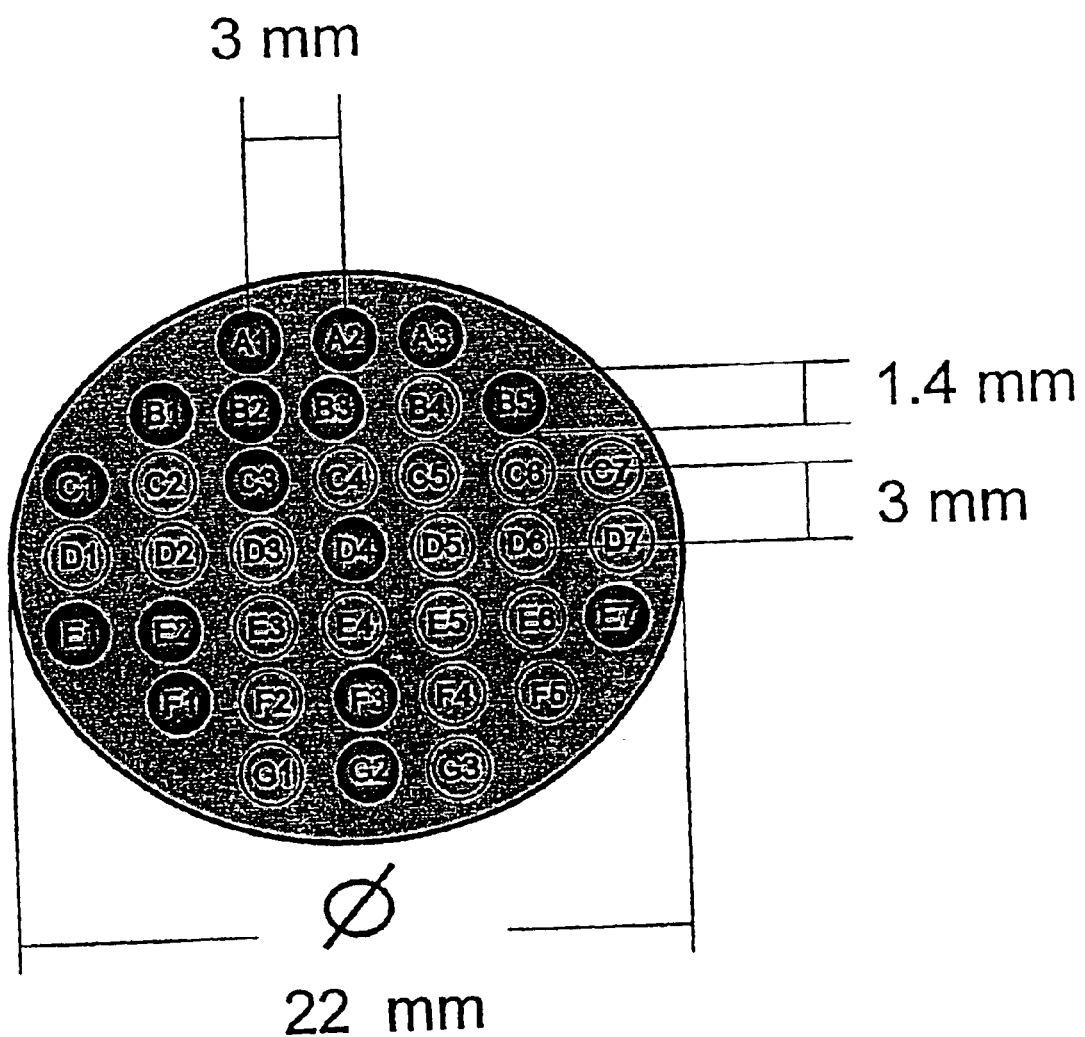
FIG. 2: Identification of the materials library. The compositions of the individual sample spots are summarized in Table 1.

The Reactor Employed:

FIG. 1 shows a construction drawing of the pressure-sealed reactor. In a cylindrical pressure vessel made of steel (total diameter: 40 mm, inner diameter; 24.5 mm) and having a height of 22.7 mm, there is provided a silicon single-crystal wafer of 22 mm diameter. By three screws, a steel plate with a Teflon insert is pressed onto this Si single-crystal wafer, the bores in the plate representing the reaction chambers. FIG. 2 shows the pattern with the corresponding distances. The different reaction solutions are pipetted into this mask by means of a robot or by hand (1 to 2 $\mu$L). As a seal for the reaction, a further Teflon disk follows which is again pressed against the remaining structure using a thick steel plate and three screws so that the whole assembly is pressure-sealed.

Experimental Sample:

In a typical charge, 2.27 g (10.9 mmol) of tetraethyl orthosilicate (TEOS) is mixed with 75 mg (0.33 mmol) of tetraethyl titanate in a 10 mL vessel. To this solution is added with stirring 4 g (5 mmol) of a 25% by weight solution of tetrapropylammonium hydroxide, and stirring is continued for 1 h. After 5–6 h of heating to 80–90° C., the alcohol produced is completely evaporated, and then distilled water is added to the solution to make 7.5 mL, and a typical reaction solution is obtained.

According to the information found in Table 1, 37 combinatorial modifications of the experiment were prepared. Bores A1 and E1 respectively contain the original sample described above. The bores A1–G3 (FIG. 2) are filled with 1 to 2 $\mu$L of the charges from Table 1. In Table 1, "Mixture" gives the molar ratio of the metal alkoxides employed (and thus the oxide materials in the forming product) to the template molecule employed. As sources of $SiO_2$, $TiO_2$, $ZrO_2$ and $Al_2O_3$, there were employed tetraethoxysilane $(Si(OEt)_4$, TEOS), $Ti(OEt)_4$, $Ti(OiPr)_4$ or $Ti(O''Pr)_4$, $Zr(O''Pr)_4$ and $Al(O^{sec}Bu)_3$. Since distilled water was added to the externally prepared samples to make 7.5 ml after evaporation of the alcohols, an excess of water:metal of 40:1 is present for hydrothermal synthesis in all samples.

The reaction is performed with the reactor closed at a temperature of 200° C. over a period of 36 h.

Posttreatment of the Materials Library:

The reaction is followed by lifting the top steel and Teflon plates, and the products in the microreaction chambers are separated from the mother liquor by removing the supernatant liquid using conventional techniques, such as porous magnesia sticks. Of course, this is ideally effected in one procedure using appropriate tools. Subsequently, the substances are repeatedly washed in the same way with 2 $\mu$L of distilled water. Thereafter, the open reactor with the products can be dried and, when Teflon is used as the reactor plate, calcined at a maximum of 350° C., preferably 130° C., which results in a good adhesion of the solids formed to the reactor bottom. After removing the two reaction plates of steel and the Teflon insert, the thus produced materials library (original bottom plate) can be further treated or examined. In the case of the zeolite synthesis as sought here, the materials library was annealed in a furnace at 600° C. for 10 h. If the products are to be analyzed in a vertical position, the adhesion of the samples can be improved by spraying a suitable amorphous varnish onto the library. It can subsequently be evaporated or oxidatively removed at elevated temperatures.

Identification of the Solids:

The identification of the phases of the products formed was effected with a GADDS microarea X-ray diffractometer with a Göbel mirror and a HISTAR detector. The Si plate was attached to a xyz sample stage and then, after entering the scanning parameters and storage of the spots to be measured, it was measured in reflection in a fully automated manner. The powder diffractograms were recorded with a 500 $\mu$m collimator integrally over the whole spot area. Focusing the X-ray beam to as narrow as 50 $\mu$m with a high X-ray intensity is possible using bent Göbel mirrors. Thus, individual particles in the micrometer scale are accessible to X-ray analytical examination. Under the measuring conditions chosen, no reflections from the silicon sample holder are found. When a thin plastic sheet is used as the reactor bottom or when the library is transferred to a thin plastic sheet provided with an adhesive layer, the diffractogram can also be recorded in a transmission mode. The diffractograms obtained are conveniently stored for later evaluation and can be identified by hand or in a fully automated way using standard libraries for comparison.

Figure 3:
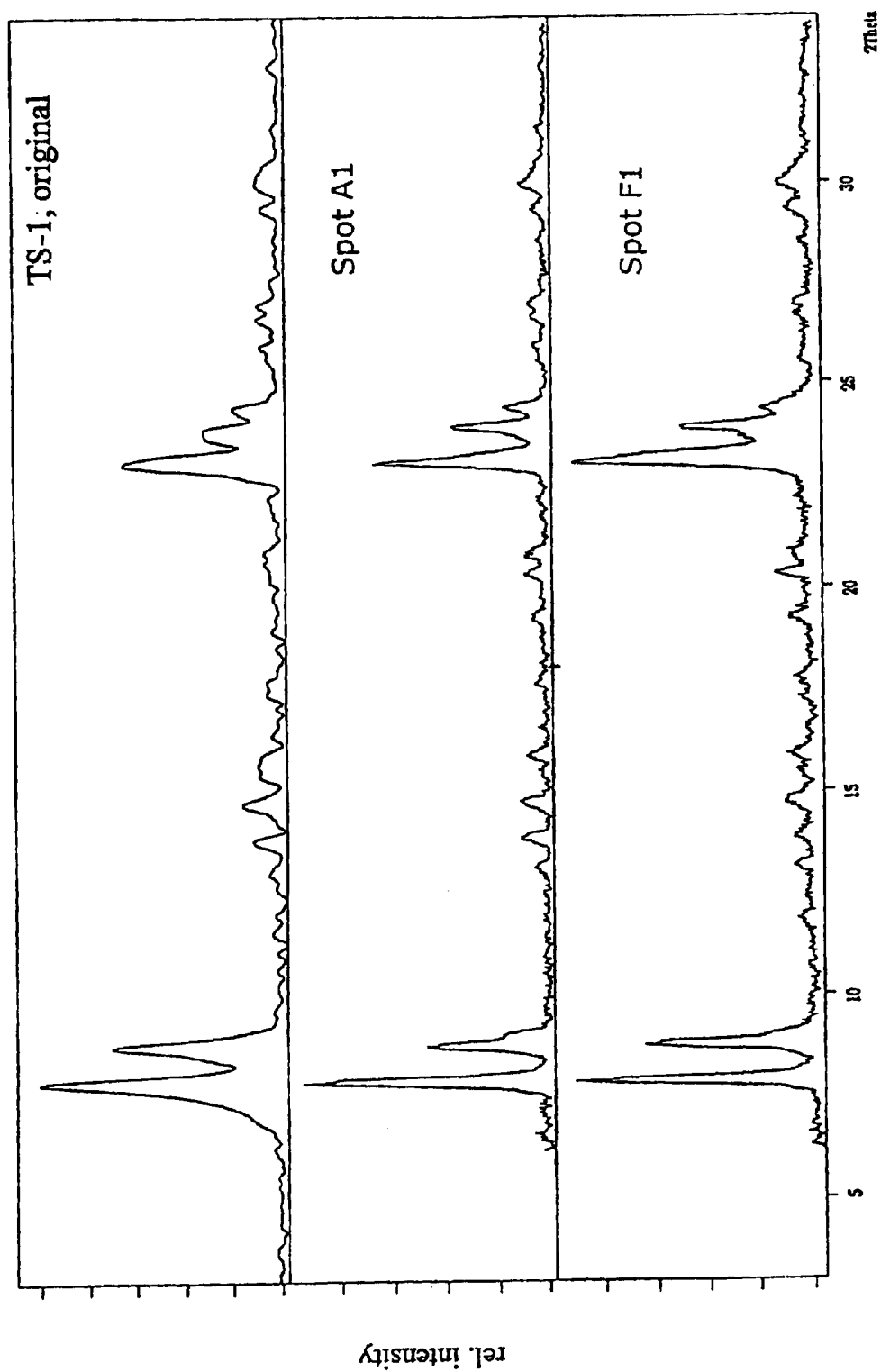
FIG. 3: On the top of this Figure, there is shown the X-ray diffraction diagram of a conventionally prepared TS-1 zeolite as an example, and below, the identical X-ray scattering images are shown as obtained from the materials library at the stated spots from total amounts of substance in the $\mu$g range, proving that crystalline inorganic materials such as zeolites can be prepared and identified by the stated method.

The evaluation of the diffractograms showed that the spots highlighted in gray in FIG. 2 contain crystalline fractions while all non-highlighted spots contain amorphous materials. The structure of the crystalline phases was identified by comparing their diffractograms with a diffractogram library. The reaction mixtures for producing the solids in spots A1 and F1 are in accordance with classical synthesis. In FIG. 3, the powder record from the conventionally produced zeolite (top) is compared with the diffractograms of spots A1 and F1. FIG. 3 proves that the microgram quantities of the materials library produced a material identical with that obtained by conventional synthesis.

TABLE 1

Composition of the Material Spots in the Library of FIG. 2.

| Bore | Mixture | Bore | Mixture |
|---|---|---|---|
| A1 | Si:Ti:NPr$_4$OH 1:0.03:0.45 | D5 | Al:Ti:CTAB 1:0.05:0.1 |
| A2 | Si:Ti:NBu$_4$OH 1:0.03:0.45 | D6 | Al:Zr:NBu$_4$OH 1:0.2:0.4 |
| A3 | Si:Ti:NEt$_4$OH 1:0.03:0.45 | D7 | Al:Zr:NMe$_4$OH 1:0.2:0.4 |
| B1 | Si:Ti:NMe$_4$:OH 1:0.03:0.45 | E1 | Al:Zr:NEt$_4$OH 1:0.2:1 |
| B2 | Si:Ti:C$_4$H$_9$N 1:0.03:0.45 | E2 | Al:Zr:CTAB 1:0.2:0.1 |
| B3 | Si:Ti:CTAB 1:0.03:0.045 | E3 | Ti:Zr:NBu$_4$OH 1:1:0.4 |
| B4 | Si:Ti:hexadecylamine 1:0.03:0.045 | E4 | Ti:Zr:NBu$_4$OH 1:1:0.4 |
| B5 | Si:Ti:hexadecylamine:NaOH 1:0.03:0.045:0.45 | E5 | Ti:Zr:NMe$_4$OH 1:1:0.4 |
| C1 | Si:Al:NPr$_4$OH 1:0.033:0.43 | E6 | Ti:Zr:NEt$_4$OH 1:1:1 |
| C2 | Si:Al:NPr$_4$OH 1:0.066:0.43 | E7 | Ti:Zr:CTAB 1:1:0.1 |
| C3 | Si:Zr:NPr$_4$OH 1:0.03:0.98 | F1 | Si:Tu:NPr$_4$OH 1:0.03:0.45 |
| C4 | Si:V:NPr$_4$OH 1:0.03:0.45 | F2 | Si:V:NPr$_4$OH 1:0.03:0.45 |
| C5 | Si:Zr:NBu$_4$OH 1:0.03:0.4 | F3 | Si:Ti:NEt$_4$OH 1:0.03:0.45 |
| C6 | Si:Zr:NMe$_4$OH 1:0.03:0.4 | F4 | Si:Zr:NPr$_4$OH 1:0.01:0.98 |
| C7 | Al:Ti:NBu$_4$OH 1:0.05:0.4 | F5 | Si:Al:NPr$_4$OH 1:0.1:0.43 |
| D1 | Al:Ti:NMe$_4$OH 1:0.05:0.4 | G1 | Si:Ti:NPr$_4$OH 1:0.03:0.45 |
| D2 | Al:Ti:NEt$_4$OH 1:0.05:1 | G2 | Al:Si:NPr$_4$OH 1:0.2:0.43 |
| D3 | Al:Ti:NEt$_4$OH 1:0.05:1 | G3 | Al:Si:NPr$_4$OH 1:0.1:0.43 |
| D4 | Al:Ti:CTAB 1:0.05:0.1 | | |

What is claimed is:

1. A method for the wet chemical preparation of a materials library comprising a large number of solids from reaction mixtures having different compositions, characterized in that the reaction mixtures are introduced, in a spatially separated way, into microreaction chambers in removable reaction plates in a reactor and reacted in the form of solutions or suspensions in the microreaction chambers at temperatures of up to 1000° C. and internal pressures of up to 1000 bar and wherein the solids produced in the reactions are deposited in a spatially separated way on a removable reactor bottom plate.

2. The method according to claim 1, wherein the reaction mixtures are introduced into bores that are part of the reaction plate and serve as microreaction chambers.

3. The method according to claim 1, wherein the solids produced in the reactor bottom plate are subsequently separated from the supernatant liquid phase and the remaining solid phase is calcined.

4. The method according to claim 1, wherein the reactor bottom plate comprises a material that scatters X-rays elastically.

5. The method according to claim 1, wherein the solids of the materials library are subsequently characterized by non-destructive analytical methods.

6. The method according to claim 4, wherein the reactor bottom plate consists of a single-crystal slice, wherein the crystal is selected from the group consisting of Si, Cu, quartz, rutile, anatase, zirconia, Ge, Al, sapphire, Fe, Ti, Zr, Co, Ni and Sn.

7. The method according to claim 6, wherein the reactor bottom plate consists of a (711) Si single-crystal wafer.

8. The method according to claim 4, wherein the reactor bottom plate is used to characterize the solids deposited on the reactor bottom plate with reflecting microarea X-ray diffraction.

9. The method according to claim 1, wherein said reactor has a layered design, comprising: a reactor bottom plate, on top thereof a lower part of the reaction plate, made of an inert material, having bores of from 0.05 to 20 mm in diameter, on top thereof an upper part of the reaction plate, made of a hard material, having identical bores, on top thereof a sealing layer, on top thereof a layer of a hard material with which the reactor layers are compressed and sealed using suitable devices.

10. The method according to claim 9, wherein said inert material consists of Kapton, Teflon, graphite, Kevlar, Mylar or steel.

* * * * *